United States Patent
Yamashita (10) Patent No.: US 7,579,901 B2
(45) Date of Patent: Aug. 25, 2009

(54) CHARGE PUMP CIRCUIT AND ELECTRONIC CIRCUIT PROVIDED THEREWITH, AND METHOD FOR DRIVING CHARGE PUMP CIRCUIT

(75) Inventor: Keitaro Yamashita, Tokyo (JP)

(73) Assignee: TPO Hong Kong Holding Limited, Shatin (HK)

( * ) Notice: Subject to any disclaimer, the term of this patent is extended or adjusted under 35 U.S.C. 154(b) by 0 days.

(21) Appl. No.: 11/578,997

(22) PCT Filed: Apr. 25, 2005

(86) PCT No.: PCT/IB2005/051333

§ 371 (c)(1),
(2), (4) Date: Jun. 22, 2007

(87) PCT Pub. No.: WO2005/112242

PCT Pub. Date: Nov. 24, 2005

(65) Prior Publication Data

US 2007/0252639 A1    Nov. 1, 2007

(30) Foreign Application Priority Data

May 12, 2004  (JP) .............................. 2004-142799

(51) Int. Cl.
*G05F 1/10* (2006.01)
*G05F 3/02* (2006.01)

(52) U.S. Cl. .................. 327/536; 327/148; 327/157; 327/537; 363/59; 363/60

(58) Field of Classification Search ............ 327/148, 327/157, 536, 537; 363/59, 60
See application file for complete search history.

(56) References Cited

U.S. PATENT DOCUMENTS

| | | | |
|---|---|---|---|
| 6,046,626 A | | 4/2000 | Saeki et al. |
| 6,169,428 B1* | | 1/2001 | Mader ..................... 327/101 |
| 7,257,009 B2* | | 8/2007 | Negoi ....................... 363/59 |
| 2003/0112037 A1* | | 6/2003 | Inoue et al. ................ 327/72 |
| 2003/0122610 A1* | | 7/2003 | Zeng et al. ............... 327/536 |
| 2003/0214346 A1* | | 11/2003 | Pelliconi ................. 327/536 |
| 2004/0071252 A1 | | 4/2004 | Boerstler |
| 2007/0109032 A1* | | 5/2007 | Park et al. ................ 327/157 |

FOREIGN PATENT DOCUMENTS

| | | |
|---|---|---|
| EP | 1 047 196 B1 | 10/2000 |
| JP | 1-134796 A | 5/1989 |

* cited by examiner

*Primary Examiner*—Lincoln Donovan
*Assistant Examiner*—Brandon S Cole
(74) *Attorney, Agent, or Firm*—Birch, Stewart, Kolasch & Birch, LLP

(57) ABSTRACT

It is an object of the present invention to reliably avoid problems with a load connected when stopping the operation of a charge pump circuit. The charge pump circuit is provided with a first switching element (S1) connected to a power supply, a second switching element (S2) connected to a load (102) and a capacitor element (Cp) connected between the first switching element (S1) and the second switching element (S2), and moves charge in a direction opposite to the direction in which charge moves during normal operation by inverting the phase of any one of clock signals applied to the first switching element (S1), second switching element (S2) and capacitor element (Cp) during normal operation.

10 Claims, 8 Drawing Sheets

CHARGE PUMP CIRCUIT AND ELECTRONIC CIRCUIT PROVIDED THEREWITH, AND METHOD FOR DRIVING CHARGE PUMP CIRCUIT

TECHNICAL FIELD

The present invention relates to a charge pump circuit and an electronic circuit provided therewith and a method for driving a charge pump circuit.

BACKGROUND ART

Conventionally, a liquid crystal display device provided with a charge pump circuit is known in which the charge pump circuit steps up an input voltage and outputs the stepped-up voltage as an output voltage. Such a charge pump circuit can step up a voltage with a relatively simple circuit.

A liquid crystal display device provided with a charge pump circuit is proposed in which the charge pump circuit forms a control voltage to stabilize the above-mentioned stepped-up voltage based on a comparison between a detection voltage corresponding to the stepped-up voltage formed by the charge pump circuit and a reference voltage and forms a display voltage through a stabilized stepped-up voltage (e.g., see Patent Document 1).

Figure 9:
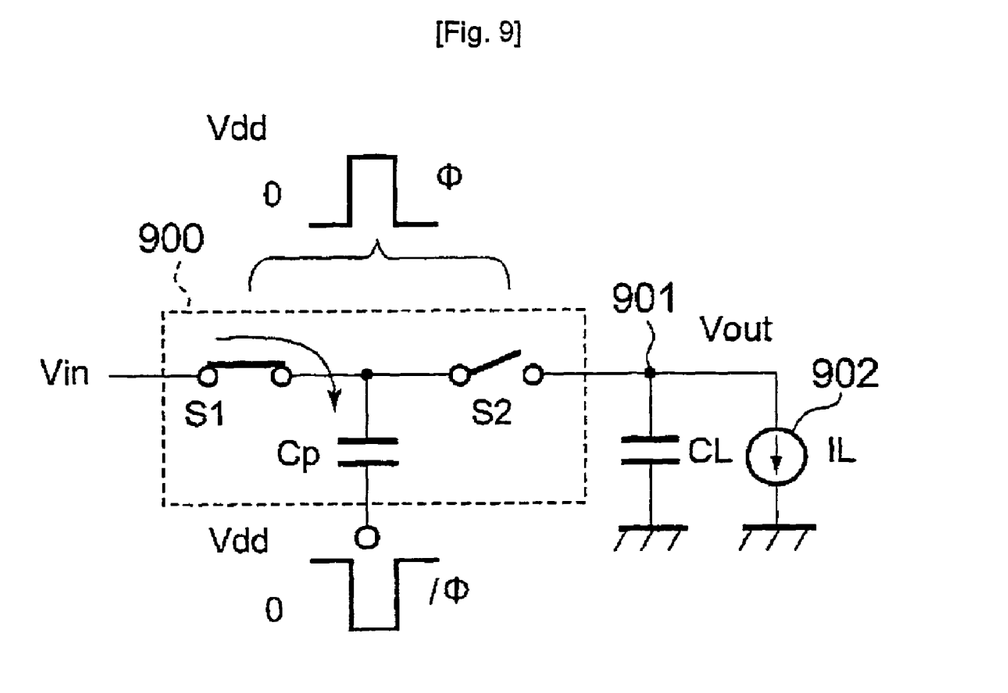
FIG. 9 is a circuit diagram illustrating an embodiment of a conventional charge pump circuit (step-up charge pump circuit)

FIG. 9 is a circuit diagram illustrating an embodiment of a conventional charge pump circuit (step-up charge pump circuit) used for such a liquid crystal display device, etc.

The charge pump circuit 900 steps up an input voltage Vin and outputs the stepped-up voltage as an output voltage Vout. Such a charge pump circuit 900 is constructed of two switching elements S1 and S2 and a capacitor Cp. The switching element S1 and switching element S2 are constructed by combining an n-type transistor and p-type transistor. In the charge pump circuit 900, the switching element S1 is an n-type transistor and the switching element S2 is a p-type transistor. The capacitor Cp is connected between these switching element S1 and switching element S2.

A main power supply Vdd is connected to the switching element S1 and the input voltage Vin is supplied to the charge pump circuit 900. An output terminal 901 is connected to the switching element S2 and charge (output voltage Vout) stored in the capacitor Cp is output from the output terminal 901. A load 902 is connected to the output terminal 901. The load 902 is, for example, a liquid crystal display element and a current IL is required to drive the load 902. A capacitor CL for ripple elimination is connected to the output terminal 901.

Terminals (not shown) provided for the two switching elements S1 and S2 (hereinafter referred to as 'switching element terminals') and the terminal of the capacitor Cp not connected to the switching elements S1 and S2 (hereinafter referred to as 'capacitor terminal') are used as clock signal input terminals to which clock signals with mutually opposite phases are applied. Here, a clock signal defined by phase Φ is applied to the former and a clock signal defined by phase/Φ (⌈/⌉ denotes logical inversion) is applied to the latter. FIG. 9 shows that the clock signal corresponding to the former is in a high level state and the clock signal corresponding to the latter is in a low level state.

When the clock signals are in the states shown in the figure, the switching element S1 is electrically on, while the switching element S2 is electrically off. On the other hand, the capacitor Cp is in a low-potential state. Thus, charge corresponding to the input voltage Vin moves to the capacitor Cp.

Then, when the phase of the clock signal is inverted, the charge stored in the capacitor Cp moves to the load 902 side. That is, when the clock signal corresponding to the switching element terminal is inverted to a low level and the clock signal corresponding to the capacitor terminal is inverted to a high level, the switching element S1 becomes electrically off and the switching element S2 becomes electrically on. On the other hand, the capacitor Cp is in a high-potential state. For this reason, the charge stored in the capacitor Cp moves from the output terminal 901 to the load 902 side.

Thus, the operation of moving the charge to the capacitor Cp and the operation of moving the charge to the load 902 side are repeated.

[Patent Document 1] Unexamined Japanese Patent Publication No. 2003-295830 (FIG. 3)

DISCLOSURE OF INVENTION

Technical Problem

Figure 10:
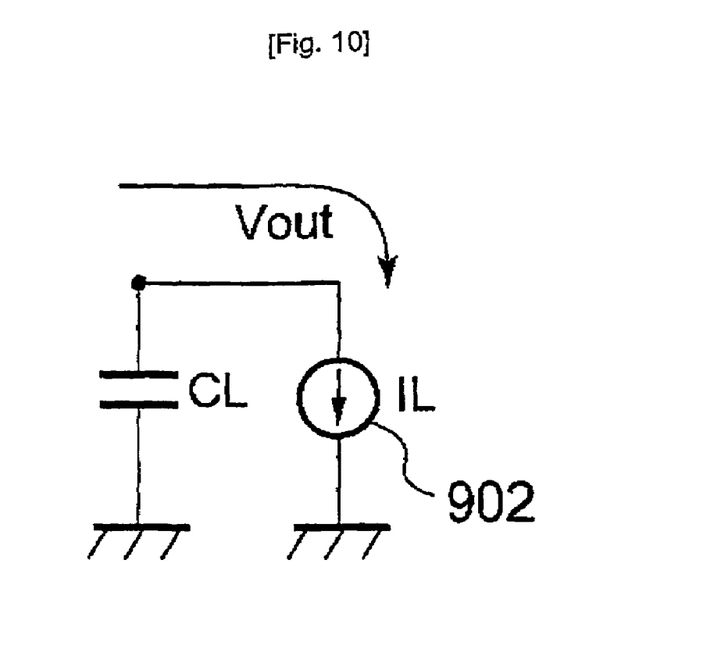
FIG. 10 illustrates a voltage condition around a load connected to the conventional charge pump circuit.

However, when the charge pump circuit 900 shown in FIG. 9 stops the operation of the charge pump circuit, the operation is stopped with charge remaining in the capacitor CL. Such charge continues to be stored in the capacitor CL unless the charge is discharged through the load 902 or leakage current. In this case, as shown in FIG. 10, the voltage corresponding to the charge stored in the capacitor CL continues to be applied to the load 902. When the voltage applied to the load 902 remains, even if the operation of the charge pump circuit 900 is stopped, this may cause not only misoperation of the load 902 but also a malfunction of the load 902.

The problem is not limited to the charge pump circuit which steps up the input voltage Vin shown in FIG. 9 but can likewise occur with a charge pump circuit which steps down the input voltage Vin.

Figure 11:
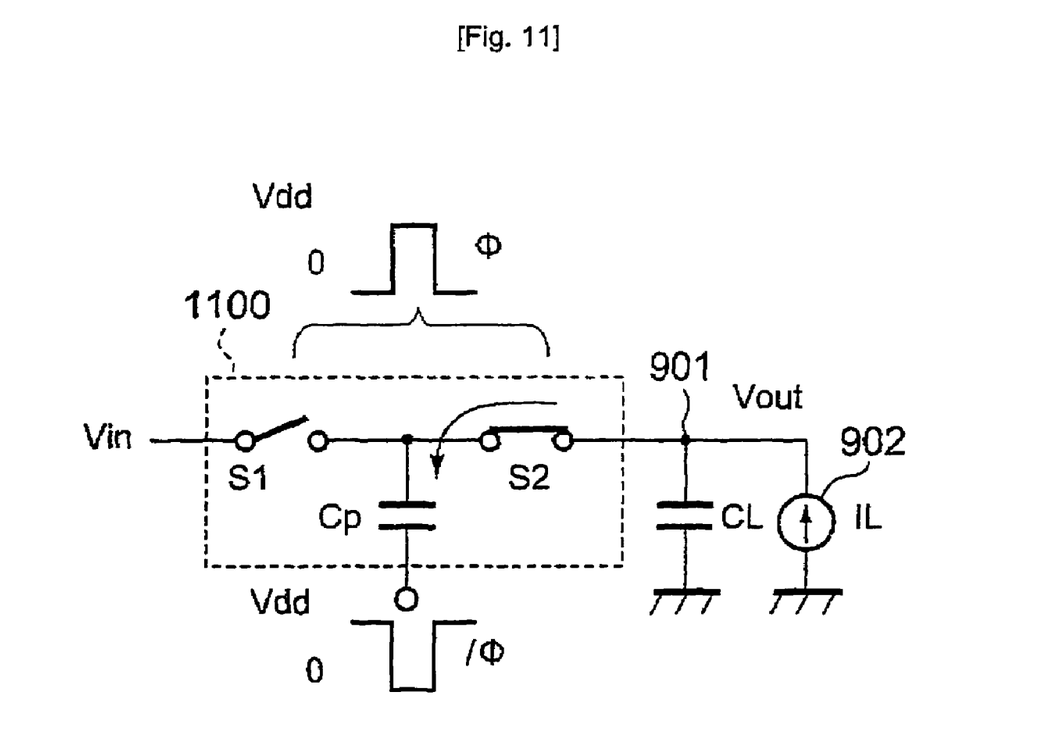
FIG. 11 is a circuit diagram illustrating an embodiment of a conventional charge pump circuit (step-down charge pump circuit)

FIG. 11 is a circuit diagram illustrating a conventional charge pump circuit (stepdown charge pump circuit). In FIG. 11, the components assigned the same reference numerals as those in FIG. 9 have the same functions and explanations thereof will be omitted. In the charge pump circuit shown in FIG. 11, the switching element S1 is a p-type transistor and the switching element S2 is an n-type transistor.

The charge pump circuit 1100 shown in FIG. 11 is designed to step down an input voltage Vin and output the stepped-down voltage as an output voltage Vout. FIG. 11 shows that the clock signal to the switching element terminal is in a high level state and the clock signal to the capacitor element terminal is in a low level state.

When the clock signals are in the states shown in the figure, the switching element S1 is electrically off, while the switching element S2 is electrically on. On the other hand, the capacitor Cp is in a low-potential state. For this reason the charge (positive charge) stored in the capacitor CL moves to the capacitor Cp.

Then, when the phase of the clock signal is inverted, the charge (positive charge) stored in the capacitor Cp moves to the main power supply Vdd side. That is, when the clock signal to the switching element terminal is inverted to a low level and the clock signal to the capacitor terminal is inverted to a high level, the switching element S1 becomes electrically on and the switching element S2 becomes electrically off. On the other hand, the capacitor Cp is put in a high-potential state. For this reason, the charge (positive charge) stored in the capacitor Cp moves to the main power supply Vdd side through the switching element S1.

In this way, the operation of moving positive charge to the capacitor Cp from the load 902 side according to the state of the clock signal and the operation of moving the positive charge to the main power supply Vdd side are repeated.

Figure 12:
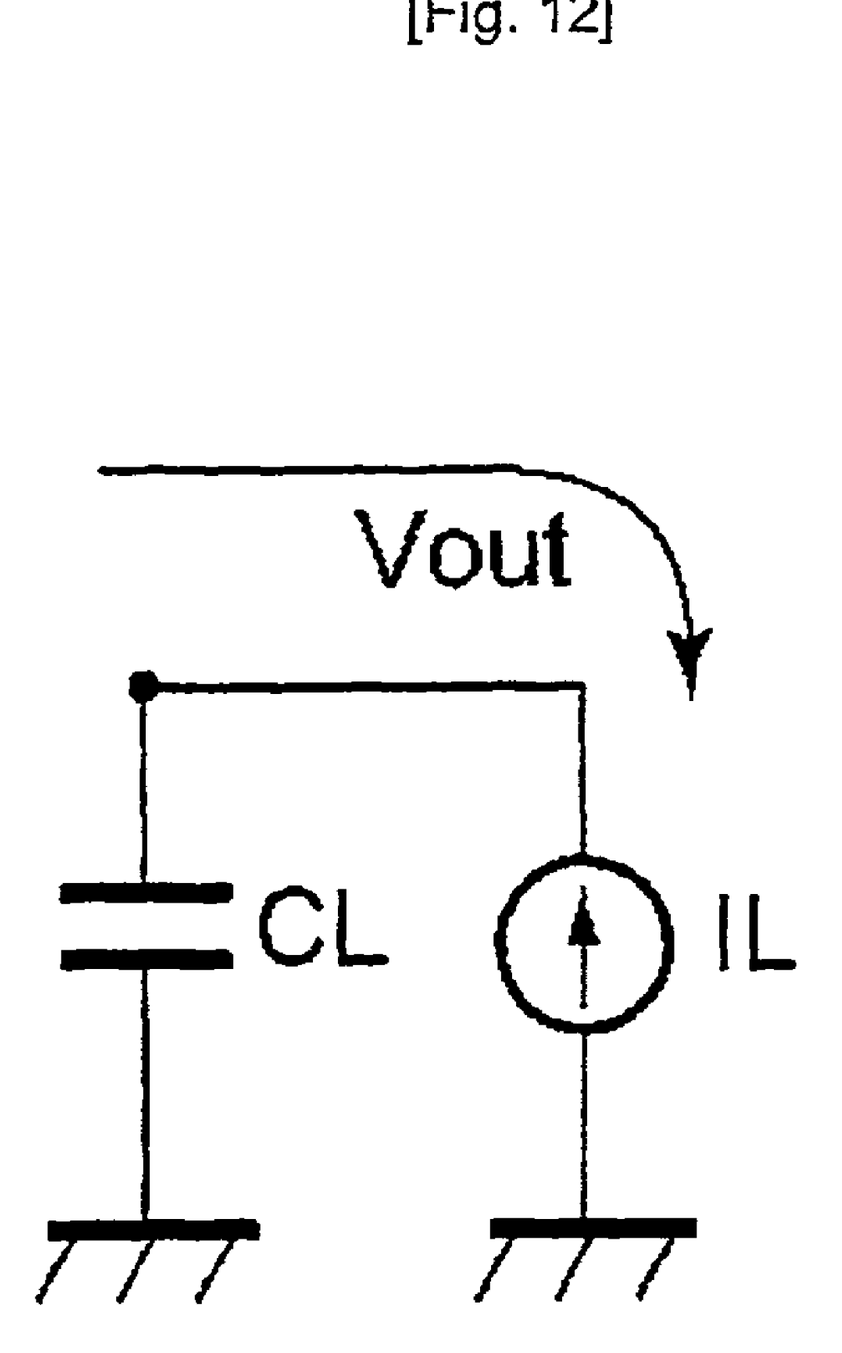
FIG. 12 illustrates a voltage condition around a load connected to the conventional charge pump circuit.

In such a charge pump circuit 1100, when the charge pump circuit 1100 stops the operation as in the case of the charge pump circuit 900, the operation may be stopped with charge (negative charge) remaining in the capacitor CL. Such charge (negative charge) stored in the capacitor CL remains unless it is discharged through the load 902 or leakage current. In this case, as shown in FIG. 12, the voltage according to the charge (negative charge) stored in the capacitor CL continues to be applied to the load 902. Even though the operation of the charge pump circuit 1100 is stopped, the voltage applied to the load 902 remains. This may cause not only misoperation of the load 902 but also a malfunction of the load 902.

The present invention has been implemented in view of such problems and it is an object of the present invention to provide a charge pump circuit capable of reliably avoiding problems with a connected load when stopping the operation of the charge pump circuit, the electronic circuit provided with this charge pump circuit and a method for driving the charge pump circuit.

Technical Solution

The charge pump circuit according to the present invention comprises a first switching element connected to a power supply, a second switching element connected to a load and a capacitor element connected between the first switching element and second switching element, wherein the phase of any one of clock signals applied to the first switching element, second switching element and capacitor element is inverted during normal operation, to thereby move charge in a direction opposite to the direction in which charge moves during the normal operation.

Furthermore, the charge pump circuit of the present invention inverts the phase of any one of clock signals applied to the first switching element, second switching element and capacitor element when stopping the normal operation.

Furthermore, the charge pump circuit of the present invention constructs a step-up charge pump circuit which steps up an input voltage supplied from the power supply, outputs the stepped-up voltage to the load as the output voltage, moves charge from the power supply side to the load side during normal operation and moves charge from the load side to the power supply side when stopping the normal operation.

Especially, the charge pump circuit of the present invention constructs the first switching element using an n-type transistor and the second switching element using a p-type transistor, applies clock signals of the same phase to the first switching element and second switching element during normal operation, applies a clock signal of the phase which is the inverted phase of the clock signals to the switching elements to the capacitor element and inverts the phase of the clock signal applied to the capacitor element when stopping the normal operation.

Furthermore, the charge pump circuit of the present invention constructs a step-down charge pump circuit which steps down an input voltage supplied from the power supply and outputs the stepped-down voltage to the load as the output voltage, moves charge from the load side to the power supply side during normal operation and moves charge from the power supply side to the load side when stopping the normal operation.

Especially, the charge pump circuit of the present invention constructs the first switching element using a p-type transistor and the second switching element using an n-type transistor, applies clock signals of the same phase to the first switching element and second switching element during normal operation, applies a clock signal of the phase opposite to the phase of the clock signals to the switching elements to the capacitor element and inverts the phase of the clock signal applied to the capacitor element when stopping the normal operation.

The electronic circuit of the present invention comprises the above-mentioned charge pump circuit, an oscillator which supplies a clock signal to this charge pump circuit and phase switching means for switching the phase of the clock signal supplied to the charge pump circuit, wherein the phase switching means inverts the phase of any one of clock signals applied to the first switching element, second switching element and capacitor element of the charge pump circuit during normal operation according to a signal instructing the stop of the charge pump circuit.

The electronic circuit of the present invention further comprises a comparator which compares the output voltage of the charge pump circuit with a reference voltage and a limit voltage power supply which supplies a preset limit voltage as this reference voltage to the comparator, wherein the supply of a clock signal from the oscillator is stopped when the output voltage of the charge pump circuit reaches the reference voltage.

The method for driving a charge pump circuit according to the present invention is a method for driving a charge pump circuit provided with a first switching element connected to a power supply, a second switching element connected to a load and a capacitor element connected between the first switching element and second switching element, comprising the steps of moving charge in a first direction according to clock signals applied to the first switching element, second switching element and capacitor element during normal operation and inverting the phase of any one of the clock signals applied to the first switching element, second switching element and capacitor element when stopping the normal operation to thereby move charge in a second direction opposite to the first direction.

Furthermore, the method for driving a charge pump circuit of the present invention is a method for driving a step-up charge pump circuit which steps up an input voltage supplied from a power supply and outputs the stepped-up voltage to a load as the output voltage, comprising the steps of moving charge from the power supply side to the load side during normal operation and moving charge from the load side to the power supply side when stopping the normal operation.

Especially, the method for driving a charge pump circuit, constructing the first switching element using an n-type transistor and the second switching element using a p-type transistor, according to the present invention comprises the steps of applying clock signals of the same phase to the first switching element and second switching element during normal operation, applying a clock signal of the phase which is the inverted phase of the clock signals to the above-mentioned switching elements to the capacitor element and inverting the phase of the clock signal applied to the capacitor element when stopping the normal operation.

Furthermore, the method for driving a charge pump circuit of the present invention is a method for driving a step-down charge pump circuit which steps down an input voltage supplied from a power supply and outputs the stepped-down voltage to a load as the output voltage, comprising the steps of moving charge from the load side to the power supply side during normal operation and moving charge from the power supply side to the load side when stopping the normal operation.

Especially, the method for driving a charge pump circuit, constructing the first switching element using a p-type transistor and the second switching element using an n-type transistor, according to the present invention comprises the steps of applying clock signals of the same phase to the first switching element and second switching element during normal operation and applying a clock signal of the phase which is the inverted phase of the clock signals to the above-mentioned switching elements to the capacitor element and inverting the phase of the clock, signal applied to the capacitor element when stopping the normal operation.

Advantageous Effects

According to the charge pump circuit, the electronic circuit provided therewith and the method for driving a charge pump circuit of the present invention, when the operation of the charge pump circuit is stopped, it is possible to reliably avoid problems with a connected load.

BEST MODE

With reference now to the attached drawings, embodiments of the present invention will be explained in detail below.

Figure 1:
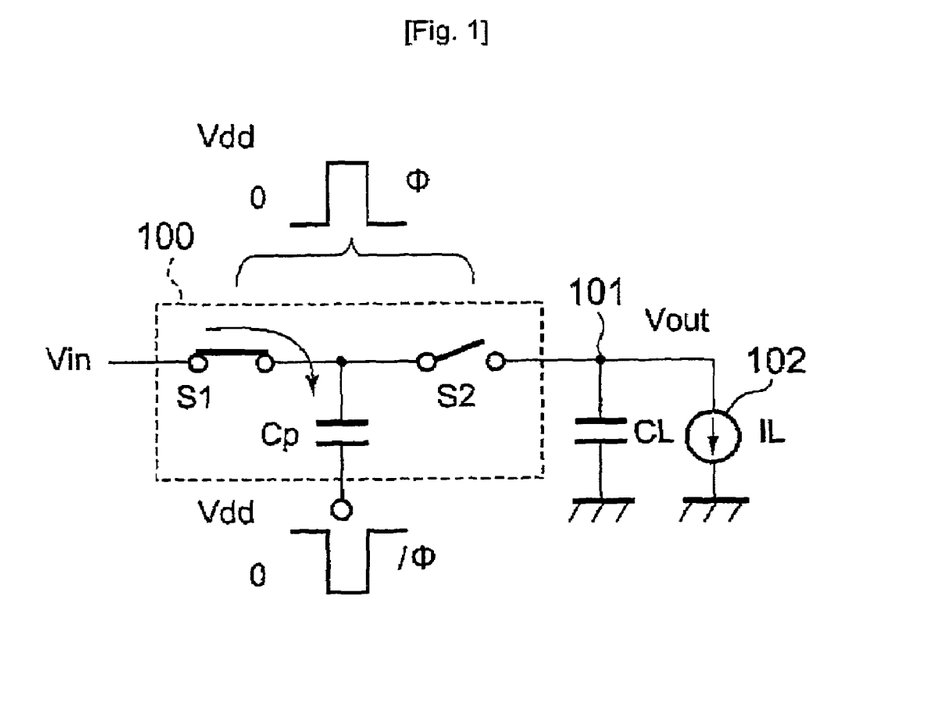
FIG. 1 is a circuit diagram illustrating a charge pump circuit (step-up charge pump circuit) according to an embodiment of the present invention.

FIG. 1 is a circuit diagram illustrating a charge pump circuit (step-up charge pump circuit) according to an embodiment of the present invention. FIG. 1 shows the state of the charge pump circuit during normal operation. For convenience of explanation, FIG. 1 illustrates a circuit diagram having the same configuration as that of the circuit diagram explained in the prior art.

That is, the charge pump circuit 100 steps up an input voltage Vin and outputs the stepped-up voltage as an output voltage Vout. Such a charge pump circuit 100 is constructed of two switching elements S1 and S2 and a capacitor Cp. The switching element S1 and switching element S2 are constructed of a combination of an n-type transistor and a p-type transistor. The switching element S1 is an n-type transistor and the switching element S2 is a p-type transistor in the charge pump circuit 100. A capacitor Cp is connected between these switching element S1 and switching element S2.

A main power supply Vdd is connected to the switching element S1 and an input voltage Vin is supplied to the charge pump circuit 100. An output terminal 101 is connected to the switching element S2 and the charge (output voltage Vout) stored in the capacitor Cp is output from the output terminal 101. A load 102 is connected to the output terminal 101. This load 102 is, for example, a liquid crystal display element and a current IL is required to drive the load 102. A ripple elimination capacitor CL is connected to the output terminal 101.

Terminals (not shown) provided for the two switching elements S1 and S2 (hereinafter referred to as 'switching element terminals') and the terminal of the capacitor Cp not connected to the switching elements S1 and S2 (hereinafter referred to as 'capacitor terminal') are used as clock signal input terminals to which clock signals with mutually opposite phases are applied. Here, a clock signal defined by phase Φ is applied to the former and a clock signal defined by phase/Φ is applied to the latter. In FIG. 1, the clock signal corresponding to the former is in a high level state and the clock signal corresponding to the latter is in a low level state.

When the clock signals are in the states shown in the figure, the switching element S1 is electrically on and the switching element S2 is electrically off. On the other hand, the capacitor Cp is in a low-potential state. Thus, charge corresponding to the input voltage Vin moves to the capacitor Cp.

Then, when the phase of the clock signal is inverted, the charge stored in the capacitor Cp moves to the load 102 side. That is, when the clock signal corresponding to the switching element terminal is inverted to a low level and the clock signal corresponding to the capacitor terminal is inverted to a high level, the switching element S1 becomes electrically off and the switching element S2 becomes electrically on. On the other hand, the capacitor Cp is in a high-potential state. For this reason, the charge stored in the capacitor Cp moves from the output terminal 101 to the load 102 side.

Thus, the operation of moving the charge to the capacitor Cp and the operation of moving the charge to the load 102 side according to the state of the clock signal are repeated. At this time, the capacitor CL connected to the load 102 side continues to store the charge.

When the normal operation is stopped, the charge pump circuit 100 according to this embodiment performs control so as to move the charge stored in the capacitor CL to the main power supply Vdd side in such a way that the voltage is not applied to the load 102.

Figure 1A:
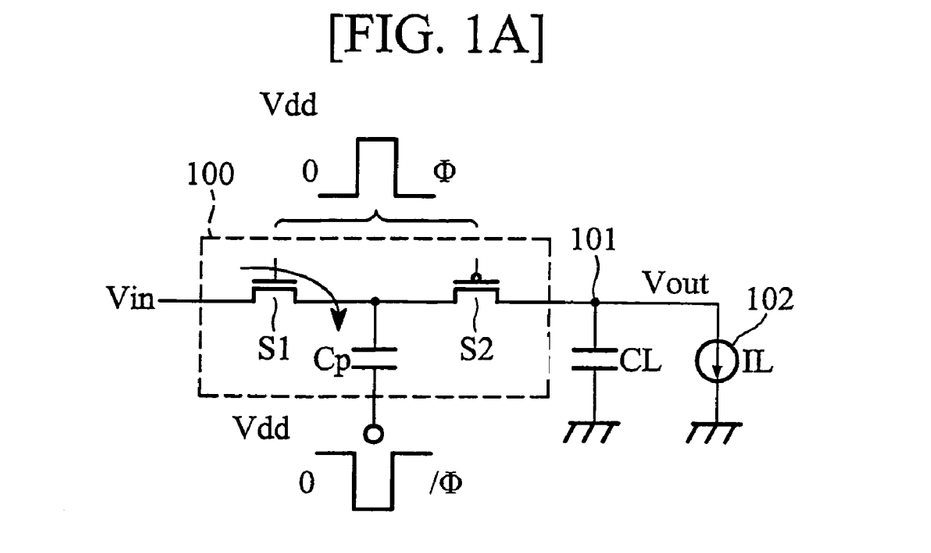
FIGS. 1A and 1B are circuit diagrams illustrating a charge pump circuit using n-type and p-type transistors as switches according to an embodiment of the invention.
Figure 1B:
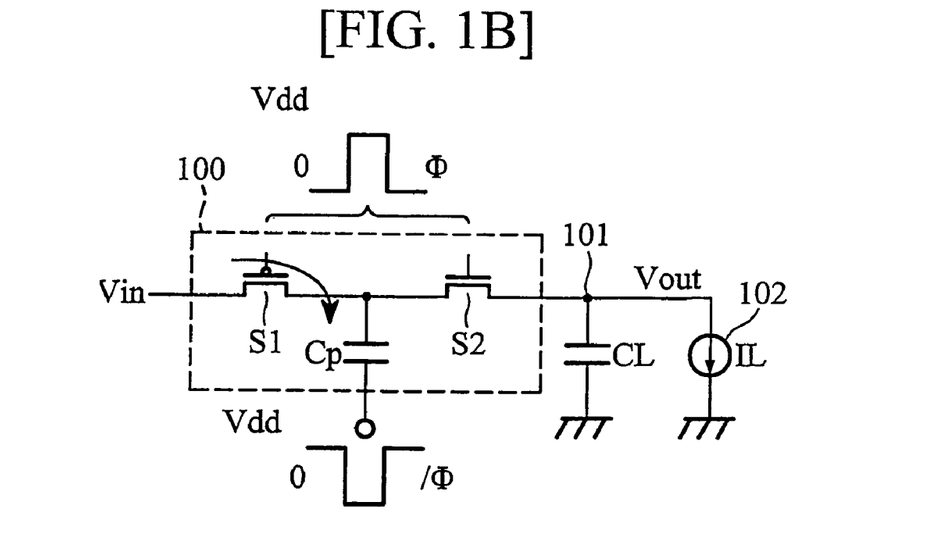

FIGS. 1A and 1B are circuit diagrams illustrating a charge pump circuit using n-type and p-type transistors as switches according to an embodiment of the invention.

Figure 2:
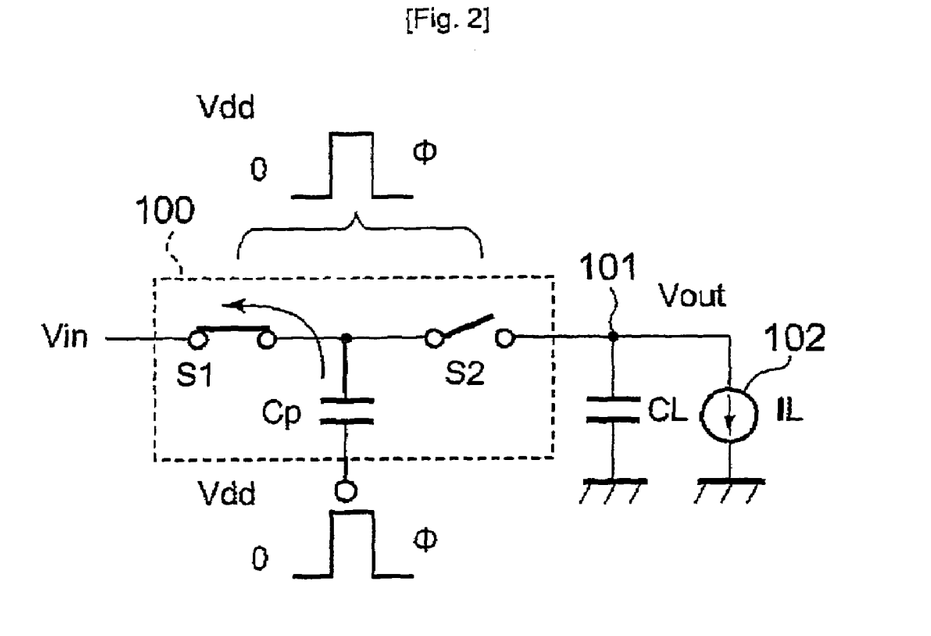
FIG. 2 is a circuit diagram illustrating a state immediately before stopping the operation of the charge pump circuit according to the above-mentioned embodiment.

FIG. 2 is a circuit diagram illustrating a state immediately before stopping the operation of the charge pump circuit (step-up charge pump circuit) according to this embodiment As shown in the figure, when stopping the operation of the charge pump circuit during normal operation, the charge pump circuit 100 applies a clock signal of the same phase to the switching element terminal and capacitor terminal. More specifically, the phase of the clock signal to the switching element terminal is kept to the same phase (Φ) as the phase during normal operation, while the phase of the clock signal to the capacitor terminal is switched to the inverted phase (Φ). FIG. 2 shows that the clock signals to both terminals are in a high level state.

As shown in FIG. 2, when clock signals with the same phase are applied to the switching element terminal and the capacitor terminal, if the clock signals to both terminals are at a low level, the switching element S1 becomes electrically off, while the switching element S2 becomes electrically on. On the other hand, the capacitor Cp is in a low-potential state. For this reason, the charge stored in the capacitor CL moves to the capacitor Cp.

Then, when the phase of the clock signal is inverted, the state is changed to the state shown in FIG. 2 and the charge stored in the capacitor Cp moves to the main power supply Vdd side. That is, when the clock signals to the switching element terminal and capacitor terminal are inverted to a high level the switching element S1 becomes electrically on and the switching element S2 becomes electrically off. On the other hand, the capacitor Cp is in a high-potential state. For this reason, the charge stored in the capacitor Cp moves to the main power supply Vdd side through the switching element S1.

In this way, the operation of moving charge from the load 102 side to the capacitor Cp according to the clock signal state and the operation of moving the charge to the main power supply Vdd side are repeated. This causes the charge stored in the capacitor CL to move the main power supply Vdd side.

Thus, when stopping the normal operation, the charge pump circuit 100 according to this embodiment performs control so as to move the charge stored in the capacitor CL to the main power supply Vdd side in such a way that no voltage is applied to the load 102. More specifically, the charge pump circuit 100 which applies clock signals with mutually opposite phases to the switching element terminal and capacitor terminal to thereby step up the input voltage Vin inverts the phase of the clock signal to the capacitor terminal so as to apply the clock signals of the same phase to both terminals. This causes a pumping operation to be performed in a direction opposite to the direction of the pumping operation from the main power supply Vdd side to the load 102 side during normal operation. For this reason, the charge stored in the capacitor CL during normal operation moves to the main power supply Vdd side. As a result, when the operation of the charge pump circuit 100 is stopped, it is possible to reliably avoid the voltage according to the charge stored in the capacitor CL from being applied to the load 102.

The charge pump circuit 100 according to this embodiment controls to move the charge stored in the capacitor CL to the main power supply Vdd side (hereinafter referred to as 'charge back control') when stopping the operation of the circuit. It is preferable to start such charge back control by, for example, detecting a signal instructing the stop of driving the load 102 (for example, liquid crystal display element) by the user of the liquid crystal display device provided with the charge pump circuit 100. On the other hand, it is preferable to stop charge back control by, for example, detecting the voltage on the load 102 side according to the result of a comparison between the detection voltage and a provided reference voltage.

Figure 3:
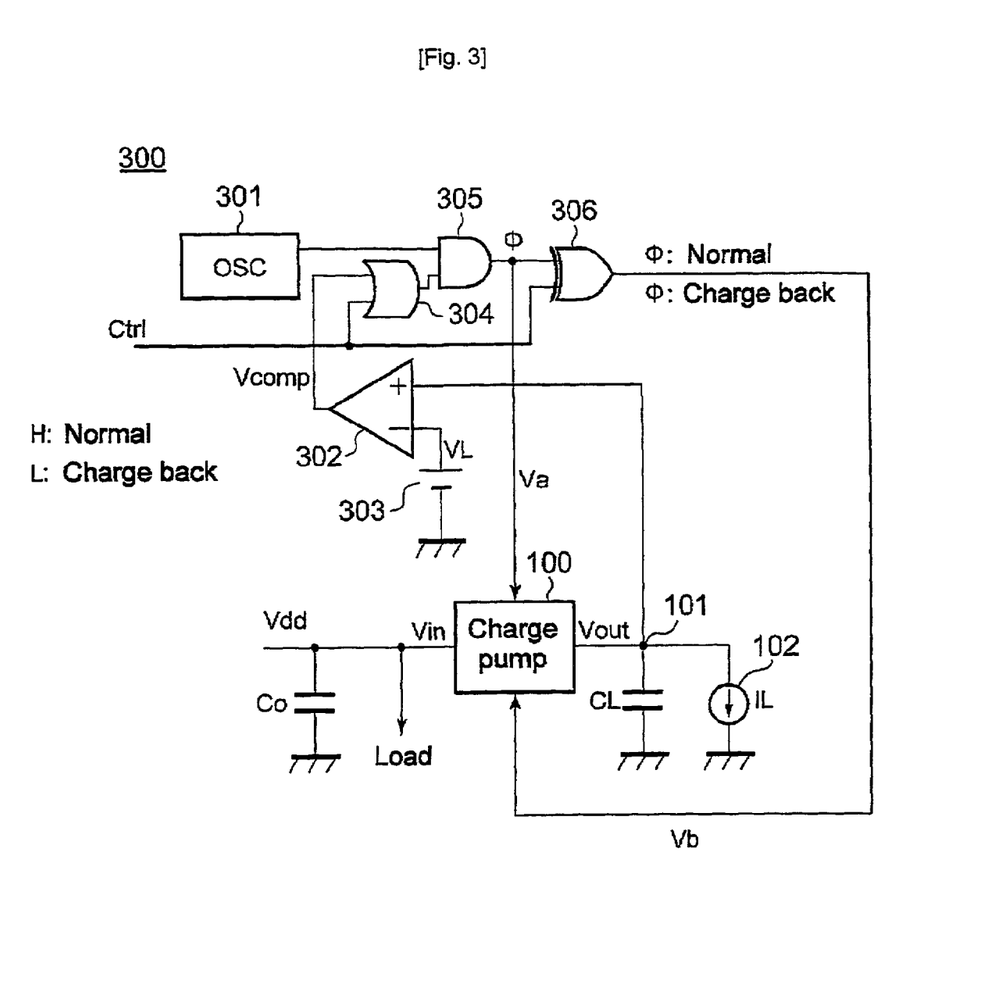
FIG. 3 shows an example of an electronic circuit for executing charge back control in the charge pump circuit according to the above-mentioned embodiment.

FIG. 3 illustrates an example of an electronic circuit for executing charge back control at the charge pump circuit 100 according to this embodiment.

The electronic circuit 300 shown in the figure is provided with a charge pump circuit 100, an oscillator (OSC) 301, a comparator 302 and a lower limit voltage source 303 as a power supply for a lower limit voltage.

The oscillator (OSC) 301 outputs a clock signal for controlling the operation of the charge pump circuit 100. More specifically, the oscillator (OSC) 301 outputs a clock signal defined by phase Φ.

The lower limit voltage source 303 is connected to the −input terminal of the comparator 302. Furthermore, an output terminal 101 is connected to the +input terminal. The comparator 302 compares a reference voltage VL applied from the lower limit voltage source 303 with the voltage (output voltage Vout) on the load 102 side. Then, the comparator 302 outputs a comparison result signal Vcomp indicating the comparison result. When the voltage on the load 102 side exceeds the reference voltage VL, the comparison result signal Vcomp shows a high level and shows a low level when the reference voltage VL exceeds the voltage on the load 102 side.

The lower limit voltage source 303 supplies the reference voltage VL to the −input terminal of the comparator 303. The reference voltage VL is a voltage to decide whether the voltage on the load 102 side has dropped to a preset lower limit voltage or not.

The electronic circuit 300 is further provided with an OR circuit 304, an AND circuit 305 and an EXOR circuit 306 as phase switching means.

The OR circuit 304 receives the comparison result signal Vcomp from the comparator 302 and a control signal Ctrl. The control signal Ctrl indicates a high level when causing the charge pump circuit 100 to execute normal control and indicates a low level causing the charge pump circuit 100 to execute charge back control. The control signal Ctrl is set to indicate a high level unless the specified instruction is given by the user of the liquid crystal display device, etc., provided with this electronic circuit 300 and indicate a low level when an instruction for the stop, etc., of the load 102 is given by the user.

The AND circuit 305 receives an output signal from the OR circuit 304 and a clock signal from the oscillator (OSC) 301. That is, when the comparison result signal Vcomp indicates a high level or the control signal Ctrl indicates a high level while the clock signal from the oscillator (OSC) 301 is being input, a clock signal Va is output from the AND circuit 305. Such a clock signal Va is defined by phase Φ. The clock signal Va from the AND circuit 305 is input to the charge pump circuit 100. More specifically, the clock signal Va is applied to the aforementioned switching element terminal.

The EXOR circuit 305 receives the clock signal Va from the AND circuit 305 and control signal Ctrl. That is, when the control signal Ctrl indicates a high level while the clock signal Va from the AND circuit 305 is being input, a clock signal Vb which corresponds to the clock signal Va with the inverted phase is output The clock signal Vb in this case is defined by phase/Φ. On the other hand, when the control signal Ctrl indicates a low level, the clock signal Vb with the same phase as the phase of the clock signal Va is output. The clock signal Vb in this case is defined by phase Φ. The clock signal Vb from the EXOR circuit is input to the charge pump circuit 100. More specifically, the clock signal Vb is applied to the above-mentioned capacitor terminal.

The electronic circuit 300 shown in FIG. 3 is designed in such a way that the other load (indicated by 'Other load' in the figure) or a capacitor Co (other charge pump circuit is omitted in the figure) owned by the other charge pump circuit is connected to the main power supply Vdd side of the charge pump circuit 100. Therefore, the charge moved to the main power supply Vdd side through charge back control is supplied to another load in normal operation or another charge pump circuit. It is also possible to regenerate the charge for another power supply system.

Figure 4:
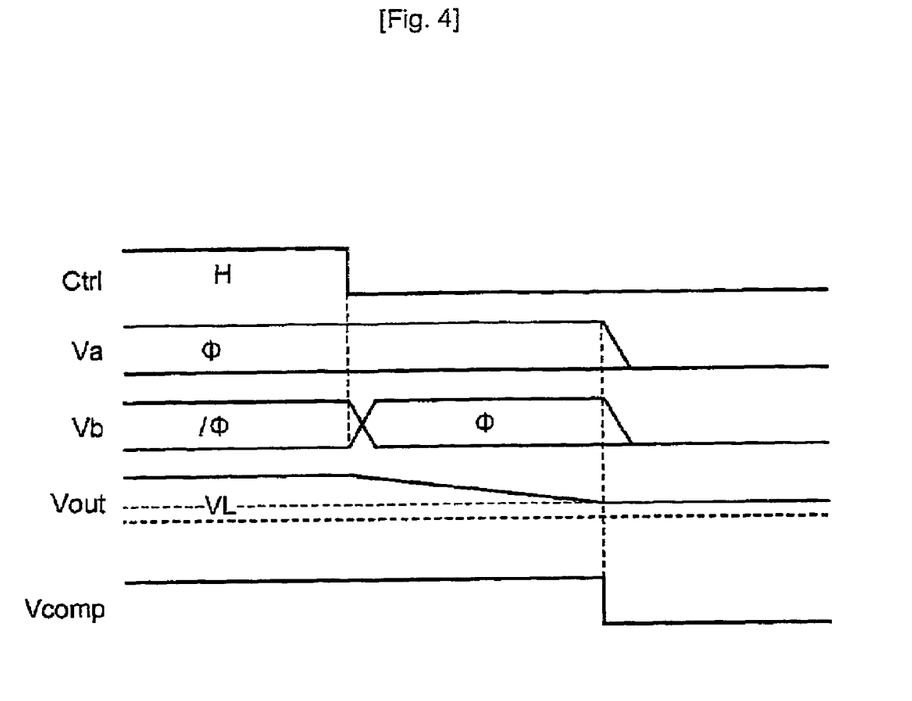
FIG. 4 illustrates a timing chart of a control signal Ctrl, clock signals Va, Vb, etc., when stopping the charge pump circuit in the electronic circuit shown in FIG. 3.

FIG. 4 illustrates a timing chart of control signal Ctrl and clock signals Va, Vb, etc., when the electronic circuit 300 shown in FIG. 3 stops the charge pump circuit 100.

When the charge pump circuit 100 is executing normal control, the electronic circuit 300 outputs a clock signal from the oscillator (OSC) 301 and the control signal Ctrl indicates a high level. For this reason, the AND circuit 305 outputs a clock signal Va to the charge pump circuit 100 and the EXOR circuit 306 as well. Since the control signal Ctrl indicates a high level while the clock signal Va is being input, the clock signal Vb (phase/Φ) is output from the EXOR circuit 306 to the charge pump circuit 100.

When the normal control is in progress, the output voltage Vout from the charge pump circuit 100, that is, the voltage on the load 102 side keeps the level exceeding the reference voltage VL. Therefore, the comparison result signal Vcomp output from the comparator 302 also indicates a high level.

Figure 5:
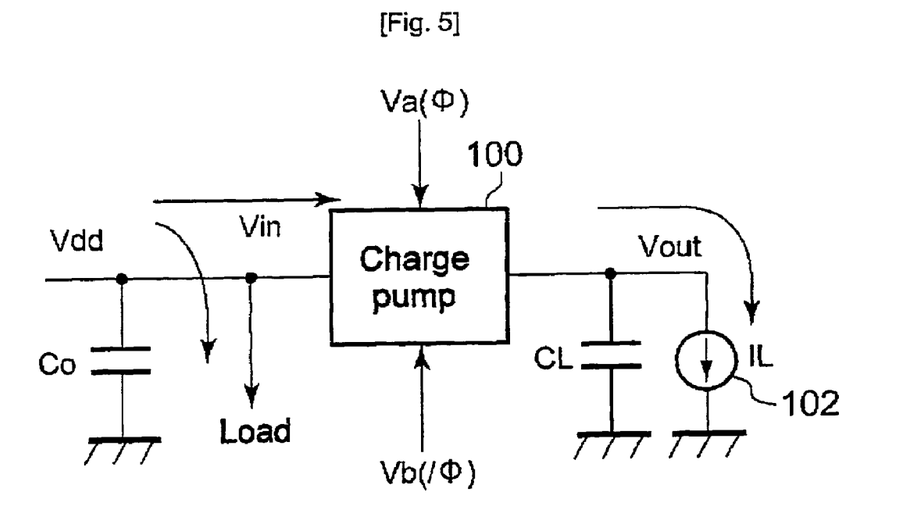
FIG. 5 illustrates a voltage supply route when the charge pump circuit is executing normal control at the electronic circuit shown in FIG. 3.

FIG. 5 illustrates a voltage supply route in the electronic circuit 300 when the charge pump circuit 100 is executing the normal control.

As shown in the figure, when the clock signal Va (phase Φ) and Vb (phase/Φ) with opposite phases are input to the charge pump circuit 100, the pumping operation from the main power supply Vdd side to the load 102 side is performed. In this way, the output voltage Vout stepped up from the input voltage Vin is supplied to the load 102 side. At this time, a voltage equivalent to the input voltage Vin from the main power supply Vdd is also supplied to another load ('Other load' in the figure).

Then, as shown in FIG. 4, when an instruction for the stop from a state, in which normal control is in progress, is given, the control signal Ctrl is switched to a low level. When the control signal Ctrl is switched, the control signal Ctrl indicates a low level while the clock signal Va is being input from the AND circuit 305. For this reason, the clock signal Vb (phase Φ) from the EXOR circuit 306 is output to the charge pump circuit 100. This causes the normal control to be switched to charge back control.

Figure 6:
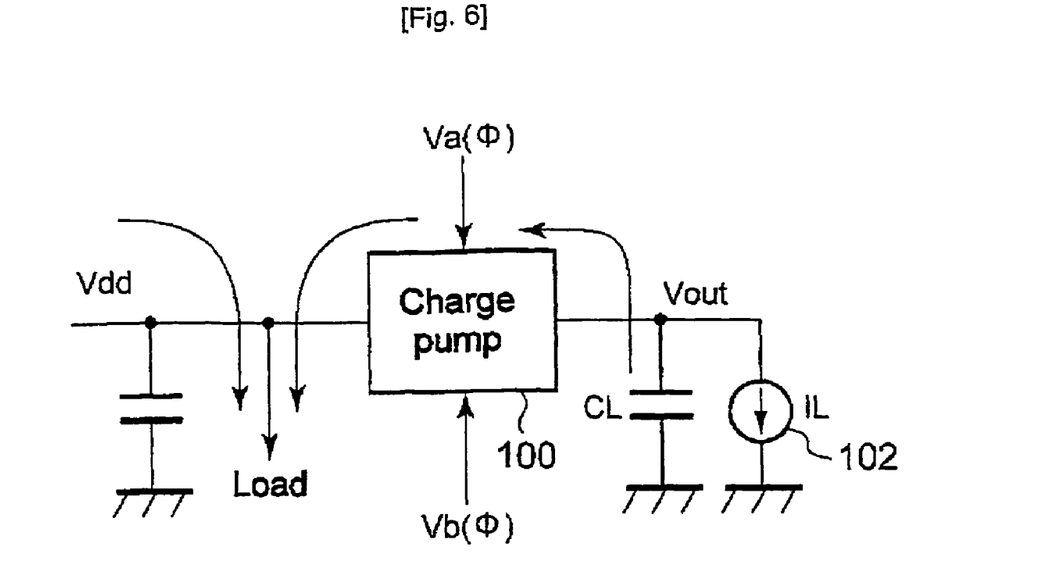
FIG. 6 illustrates a voltage supply route when the charge pump circuit is executing charge back control at the electronic circuit shown in FIG. 3.

FIG. 6 illustrates a voltage supply route in the electronic circuit 300 when the charge pump circuit 100 is executing the charge back control.

As shown in the figure, when the clock signal Va (phase Φ) and Vb (phase Φ) with the same phase are input to the charge pump circuit 100, a pumping operation in the direction from the load 102 side to the main power supply Vdd side is performed. This causes the charge stored in the capacitor CL to be supplied to the other load on the main power supply Vdd side. A voltage equivalent to the input voltage Vin from the main power supply Vdd is also supplied to the other load. Therefore, when the charge back control is in progress, the voltage from the main power supply Vdd and the voltage from the charge pump circuit 100 are also supplied to the other load.

When the charge back control is executed in this way, the voltage (output voltage Vout) on the load 102 side decreases gradually as shown in FIG. 4. When the voltage (output voltage Vout) on the load 102 side falls below the reference voltage VL, the comparison result signal Vcomp is switched to a low level.

As described above, the control signal Ctrl already indicates a low level. For this reason, when the comparison result signal Vcomp is switched to a low level, the output signal from the OR circuit 304 is also switched to a low level. Therefore, the clock signal from the AND circuit 305 is no longer output to the EXOR circuit 306. As a result, the supply of the clock signal to the charge pump circuit 100 is stopped and the operation of the charge pump circuit 100 is stopped.

Thus, the electronic circuit 300 incorporating the charge pump circuit 100 according to this embodiment can start the charge back control according to the level of the control signal Ctrl. Furthermore, the charge pump circuit 100 can stop the charge back control according to the voltage state on the load 102 side.

The explanations so far have described the case where the charge pump circuit according to the present invention is applied to a step-up charge pump circuit which steps up the input voltage Vin. However, the charge pump circuit according to the present invention is not limited to the step-up charge pump circuit, and is also applicable to a step-down charge pump circuit which steps down the input voltage Vin. The following is an explanation of a case where the charge pump circuit according to the present invention is applied to a step-down charge pump circuit.

Figure 7:
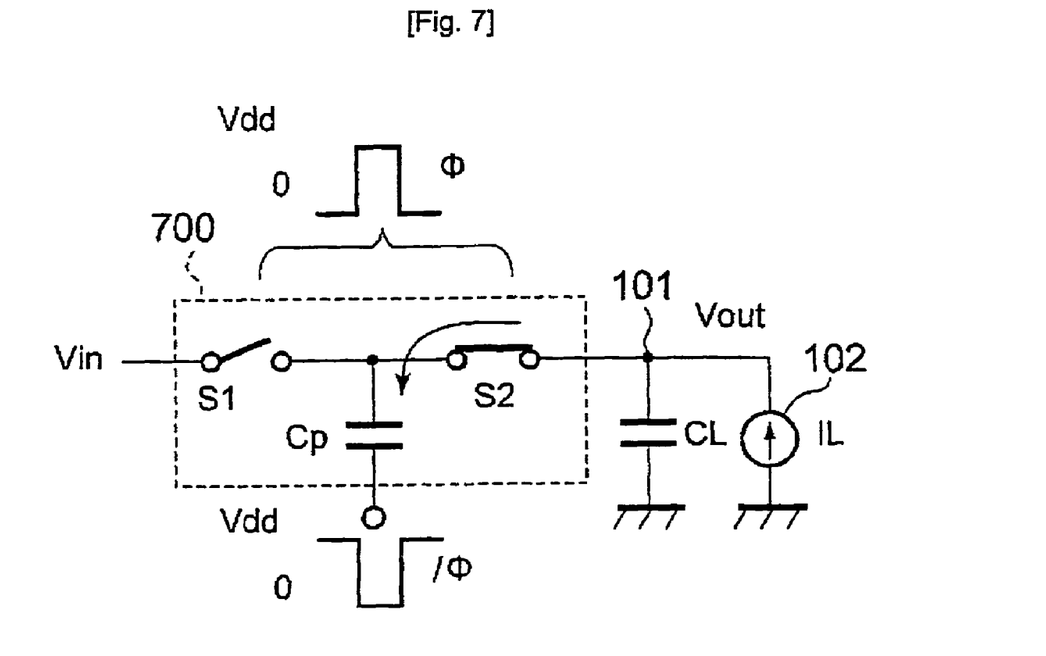
FIG. 7 is a circuit diagram illustrating an embodiment of a charge pump circuit (step-down charge pump circuit) according to an embodiment of the present invention.

FIG. 7 is a circuit diagram illustrating an embodiment of a charge pump circuit (step-down charge pump circuit) according to an embodiment of the present invention. FIG. 7 indicates a state of a charge pump circuit during normal operation.

In FIG. 7, the components assigned the same reference numerals as those in FIG. 1 have the same functions and explanations thereof will be omitted In the charge pump circuit shown in FIG. 7, the switching element S1 is a p-type transistor and the switching element S2 is an n-type transistor.

The charge pump circuit 700 shown in FIG. 7 steps down the input voltage Vin and outputs the stepped-down voltage as the output voltage Vout. FIG. 7 shows that the clock signal to the switching element terminal is at a high level and the clock signal to the capacitor element terminal is at a low level.

When the clock signals are in the states shown in the figure, the switching element S1 is electrically off, while the switching element S2 is electrically on. On the other hand, the capacitor Cp is in a low-potential state. For this reason, the charge (positive charge) stored in the capacitor CL moves to the capacitor Cp.

Then, when the phase of the clock signal is inverted, the charge (positive charge) stored in the capacitor Cp moves to the main power supply Vdd side. That is, when the clock signal to the switching element terminal is inverted to a low level and the clock signal to the capacitor terminal is inverted to a high level, the switching element S1 becomes electrically on and the switching element S2 becomes electrically off. On the other hand, the capacitor Cp is in a high-potential state. For this reason, the charge (positive charge) stored in the capacitor Cp moves to the main power supply Vdd side through the switching element S1.

Thus, the operation of moving charge from the load 102 side to the capacitor Cp and the operation of moving the charge to the main power supply Vdd side according to the state of the clock signal are repeated. At this time, the capacitor CL connected to the load 102 side continues to store charge (negative charge).

When stopping the normal operation, the charge pump circuit 700 according to this embodiment performs control so as to move charge (positive charge) from the main power supply Vdd side to the load 102 side in such a way that no voltage is applied to the load 102.

Figure 8:
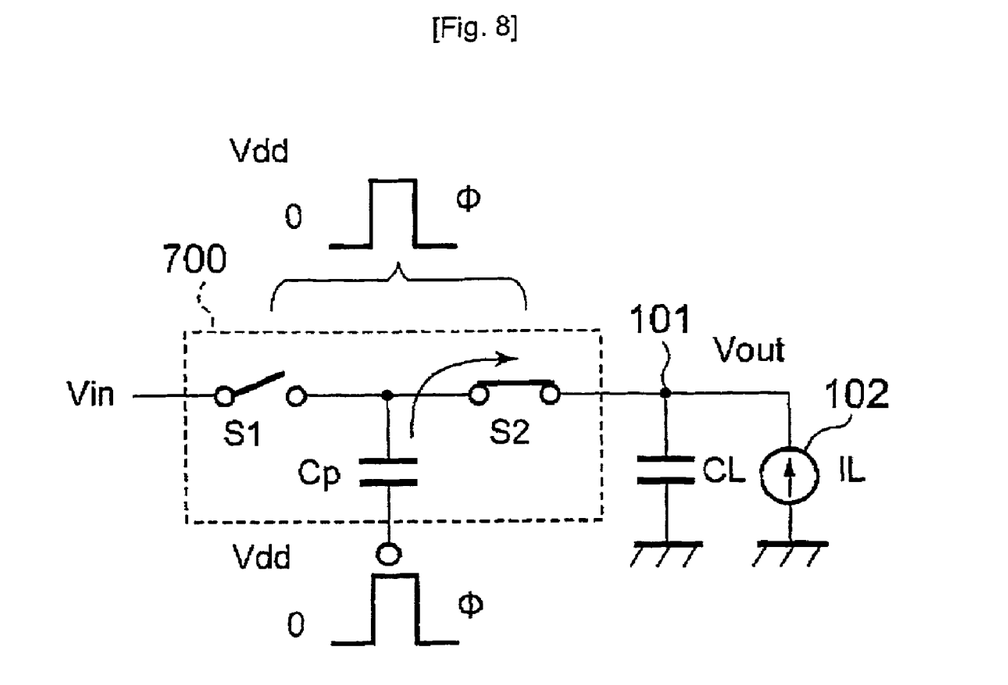
FIG. 8 is a circuit diagram illustrating a state immediately before stopping the operation of the charge pump circuit according to the above-mentioned embodiment.

FIG. 8 is a circuit diagram illustrating a state immediately before stopping the operation of the charge pump circuit (step-down charge pump circuit) according to this embodiment.

As shown in the figure, when stopping the normal operation, the charge pump circuit 700 applies clock signals with the same phase to the switching element terminal and capacitor terminal. More specifically, the charge pump circuit 700 keeps the same phase of the clock signal to the switching element terminal as the phase (Φ) during normal operation and changes the phase of the clock signal to the capacitor terminal to the inverted phase (Φ). FIG. 8 shows that the clock signals to both terminals are in a high level state.

As shown in FIG. 8, when clock signals with the same phase are applied to the switching element terminal and capacitor terminal, if the clock signals to both terminals are put in a low-level state, the switching element S1 becomes electrically on and the switching element S2 becomes electrically off. On the other hand, the capacitor Cp is in a low-potential state. For this reason, charge (positive charge) moves from the main power supply Vdd side to the capacitor Cp.

Then, when the phase of the clock signal is inverted, the state is changed to the state shown in FIG. 8 and charge (positive charge) stored in the capacitor Cp moves to the load 102 side. That is, when the clock signals to the switching element terminal and capacitor terminal are inverted to a high level, the switching element Si becomes electrically off and the switching element S2 becomes electrically on. On the other hand, the capacitor Cp is put in a high-potential state. This causes the charge (positive charge) stored in the capacitor Cp to move to the load 102 side through the switching element S2.

Thus, the operation of moving charge (positive charge) from the main power supply Vdd side to the capacitor Cp and the operation of moving the charge (positive charge) to the load 102 side according to the state of the clock signal are repeated This causes positive charge to-move from the main power supply Vdd side to the load 102 side.

Thus, the charge pump circuit 700 according to this embodiment controls to move charge (positive charge) from the main power supply Vdd side to the load 102 side in such a way that no voltage is applied to the load 102 when stopping the normal operation. More specifically, the charge pump circuit 700 which steps down the input voltage Vin by applying clock signals with mutually opposite phases to the switching element terminal and capacitor terminal inverts the phase of the clock signal to the capacitor terminal and applies clock signals of the same phase to both terminals. In this way, the pumping operation is performed in a direction opposite to the direction of the pumping operation from the load 102 side to the main power supply Vdd side during normal operation. For this reason, the charge (positive charge) moved to the main power supply Vdd side during normal operation is moved to the load 102 side. As a result, when the operation of the charge pump circuit 100 is stopped, it is possible to reliably avoid a voltage corresponding to the charge (negative charge) stored in the capacitor CL from being applied to the load 102.

Such charge back control at the charge pump circuit 700 is made possible by incorporating the charge pump circuit 700 in the electronic circuit 300 shown in FIG. 3. In this case, adjustments such as a change to the reference voltage VL, etc., are necessary.

This embodiment has explained the case where the phase of a clock signal to the capacitor terminal is inverted when both the charge pump circuit 100 which steps up the input voltage Vin and the charge pump circuit 700 which steps down the input voltage Vin execute the charge back control. However, the present invention is not limited to this if the clock signals to the switching element terminal and capacitor terminal have at least the same phase. That is, it is also possible to adopt a configuration that the phase of the clock signal to the switching element terminal is inverted.

Furthermore, this embodiment has explained the case where the charge pump circuit 100 that steps up the input voltage Vin constructs the switching elements S1 and S2 with the n-type transistor and p-type transistor respectively. However, the present invention is not limited to this and it is also possible to construct the switching elements S1 and S2 with other combinations. For example, the switching elements S1 and S2 may also be a p-type transistor and n-type transistor, n-type transistor and n-type transistor or p-type transistor and p-type transistor. Furthermore, the same is also applied to the charge pump circuit 700 which steps down the input voltage Vin.

INDUSTRIAL APPLICABILITY

The charge pump circuit, electronic circuit provided therewith and method for driving a charge pump circuit according to the present invention can reliably avoid problems with a load connected when stopping the operation of the charge pump circuit and is useful in that the invention can be operated for the connected load appropriately and for a long period of time.

The invention claimed is:

1. A charge pump circuit comprising:
a first switching element connected to a power supply;
a second switching element connected to a load, wherein said first and second switching elements are controlled by a first clock signal; and
a capacitor element connected between said first switching element and second switching element and having a terminal coupled to a second clock signal, wherein said charge pump circuit constructs a step-up charge pump circuit which steps up the input voltage supplied from the power supply, outputs the stepped-up voltage to the load as the output voltage, moves charge from the power supply side to the load side during the charge pump operation and moves charge from the load side to the power supply side after the charge pump operation has been stopped, and
during a charging pump operation, said first clock signal goes high when said second clock signal goes low and said first clock signal goes low when said second clock signal goes high, and after the charge pump operation has been stopped, said first clock signal goes high when said second clock signal goes high and said first clock signal goes low when said second clock signal goes low.

2. The charge pump circuit as claimed in claim 1, wherein said first switching element is an n-type transistor, said second switching element is a p-type transistor.

3. An electronic circuit comprising;
the charge pump circuit as claimed in claim 1;
an oscillator which supplies said first clock signal to said charge pump circuit; and
phase switching means for providing said second clock signal,
wherein said phase switching means inverts the phase of said second clock signal according to the signal instructing the stop of said charge pump circuit.

4. The electronic circuit as claimed in claim 3, further comprising: a comparator which compares the output voltage of said charge pump circuit with a reference voltage; and a limit voltage power supply which supplies a preset limit voltage as said reference voltage to said comparator, wherein the supply of a clock signal from said oscillator is stopped when the output voltage of said charge pump circuit reaches said reference voltage.

5. A charge pump circuit comprising:
   a first switching element connected to a power supply;
   a second switching element connected to a load, wherein said first and second switching elements are controlled by a first clock signal; and
   a capacitor element connected between said first switching element and second element and having a terminal coupled to a second clock signal, wherein said charge pump circuit constructs a step-down charge pump circuit which steps down the input voltage supplied from the power supply and outputs the stepped-down voltage to the load as the output voltage, moves charge from the load side to the power supply side during the charge pump operation and moves charge from the power supply side to the load side after the charge pump operation has been stopped, and
   during a charging pump operation, said first clock signal goes high when said second clock signal goes low and said first clock signal goes low when said second clock signal goes high, and after the charge pump operation has been stopped, said first clock signal goes high when said second clock signal goes high and said first clock signal goes low when said second clock signal goes low.

6. The charge pump circuit as claimed in claim 5, wherein said first switching element is a p-type transistor and said second switching element is an n-type transistor.

7. A method for driving a charge pump circuit provided with a first switching element connected to a power supply, a second switching element connected to a load and a capacitor element connected between said first switching element and second switching element, comprising the steps of:
   applying a first clock signal to said first switching element and said second switching element and applying a second clock signal to said capacitor element during a charge pump period, moving charge in a first direction, wherein said first clock signal goes high as the second clock signal goes high and the first clocks signal goes low as the second clock signal goes low during said charge pump period; and
   inverting the phase of said second clock signal applied to said capacitor element after the charge pump operation has stopped, such that said first clock signal goes high as the second clock signal goes low and the first clocks signal goes low as the second clock signal goes high, wherein said charge pump circuit constructs a step-up charge pump circuit which steps up the input voltage supplied from the power supply and outputs the stepped-up voltage to a load as an output voltage;
   moving charge from the power supply side to the load side during the charge pump operation; and
   moving charge from the load side to the power supply side after the charge pump operation has stopped.

8. The method for driving a charge pump circuit, constructing said first switching element using an n-type transistor and said second switching element using a p-type transistor, as claimed in claim 7.

9. A method for driving a charge pump circuit provided with a first switching element connected to a power supply, a second switching element connected to a load and a capacitor element connected between said first switching element and second switching element, comprising the steps of:
   applying a first clock signal to said first switching element and said second switching element and applying a second clock signal to said capacitor element during a charge pump period, moving charge in a first direction, wherein said first clock signal goes high as the second clock signal goes high and the first clocks signal goes low as the second clock signal goes low during said charge pump period;
   inverting the phase of said second clock signal applied to said capacitor element after the charge pump operation has stopped, such that said first clock signal goes high as the second clock signal goes low and the first clocks signal goes low as the second clock signal goes high, wherein said charge pump circuit constructs a step-down charge pump circuit which steps down an input voltage supplied from the power supply and outputs the stepped-down voltage to a load as the output voltage;
   moving charge from the load side to the power supply side during the charge pump operation; and
   moving charge from the power supply side to the load side after the charge pump operation has stopped.

10. The method for driving a charge pump circuit, constructing said first switching element using a p-type transistor and said second switching element using an n-type transistor, as claimed in claim 9.

* * * * *